(12) United States Patent
Nagai et al.

(10) Patent No.: US 6,969,560 B2
(45) Date of Patent: Nov. 29, 2005

(54) WEAR-RESISTANT COATING AND SILENT CHAIN COATED WITH SAME

(75) Inventors: Junichi Nagai, Osaka (JP); Kenichi Nagao, Osaka (JP); Kazumasa Iwamoto, Osaka (JP); Masahiro Onoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 24 days.

(21) Appl. No.: 10/274,605

(22) Filed: Oct. 21, 2002

(65) Prior Publication Data

US 2003/0087747 A1 May 8, 2003

(30) Foreign Application Priority Data

Nov. 6, 2001 (JP) ............................. 2001-340760

(51) Int. Cl.[7] ............................. B32B 19/00; B32B 9/00
(52) U.S. Cl. ................. 428/698; 428/697; 428/143; 428/148
(58) Field of Search ...................... 428/698, 469, 428/697, 701, 702, 143, 161, 148

(56) References Cited

U.S. PATENT DOCUMENTS

| | | | |
|---|---|---|---|
| 3,751,283 A | 8/1973 | Dawson | |
| 4,358,922 A | 11/1982 | Feldstein | |
| 4,744,725 A | 5/1988 | Matarese et al. | |
| 4,792,353 A * | 12/1988 | Kramer et al. | ................. 75/235 |
| 5,078,837 A * | 1/1992 | Descamp et al. | ........... 205/181 |
| 5,925,403 A | 7/1999 | Yoshizawa et al. | |
| 6,309,480 B1 | 10/2001 | Ruchert et al. | |
| 6,423,111 B1 | 7/2002 | Nishikita et al. | |
| 6,680,129 B2 * | 1/2004 | Wang et al. | ................. 428/627 |

FOREIGN PATENT DOCUMENTS

| | | |
|---|---|---|
| EP | 1 219 861 | 7/2002 |
| FR | 2766844 | 7/1997 |
| GB | 1109084 | 5/1965 |
| JP | 55-164068 | 12/1980 |
| JP | 57-85967 | 5/1982 |
| JP | 61-264170 | 11/1986 |
| JP | 61-284583 | 12/1986 |
| JP | 3-113175 | 5/1991 |
| JP | 03-126856 | 5/1991 |
| JP | 3-141193 | 6/1991 |
| JP | 293788 | 10/1992 |
| JP | 10-169723 | 6/1998 |
| WO | WO 02/068716 | 9/2002 |

* cited by examiner

*Primary Examiner*—Michael C. Miggins
(74) *Attorney, Agent, or Firm*—Howson and Howson

(57) ABSTRACT

A wear-resistant coating, capable of imparting excellent wear resistance to a silent chain, comprises a base coating consisting of a hard inorganic material having interspersed particles of a hard inorganic material different from the inorganic material of the base coating. A part of the interspersed particles is exposed on the surface of the coating. The coating has superior oil-retaining properties as a result of gaps formed at the interface between the particles and the base coating, and the superior oil-retaining properties contribute to the wear-resistance of the coating.

1 Claim, 3 Drawing Sheets

Wear test results by reciprocating wear test machine

US 6,969,560 B2

WEAR-RESISTANT COATING AND SILENT CHAIN COATED WITH SAME

FIELD OF THE INVENTION

This invention relates to a wear-resistant coating suitable for use as a surface coating of a silent chain used as a power transmitting chain in an automobile, a motorcycle or the like.

BACKGROUND OF THE INVENTION

In recent years, silent chains have been used for power transmission under high speed and high load conditions. In a typical silent chain, a number of link plates P, each bifurcated to provide a pair of teeth on one side, are arranged in interleaved layers connected to one another by connecting pins Q as shown in FIG. 3. On the bifurcated portion of each of the link plates P, two outside flank surfaces R1 function as meshing surfaces in an outer flank meshing silent chain, or two inside flank surfaces R2 serve as meshing surfaces in an inner flank meshing silent chain. In either case, the meshing surfaces mesh with sprockets, and transmit power from the chain to the sprockets or from the sprockets to the chain. Even if the pitch of the chain is extended, close contact between the link plate and the sprocket is maintained. Accordingly, these silent chains produce little noise, and are suitable for high speed operation and for applications in which quiet operation is required.

Since these silent chains are used at high speed and under high load, in order to improve wear-resistance, a sliding surface of a chain is provided with a coating of hard inorganic material such as titanium carbide (TiC), vanadium carbide (VC) or the like by a CVD process, a PVD process, spray coating, diffusion coating, or the like,.

To improve wear-resistance, it has been proposed to form, on a surface of a silent chain, a chromium iron alloy layer having diffused chromium carbide particles, so that the surface has enhanced hardness while maintaining toughness.

However, where a coating of the above-mentioned hard inorganic material was provided on the surface of a silent chain, several problems were encountered. The load on the coated surface, and the sliding speed, were extremely large, and when foreign substances such as worn powder and the like were increased as a result of the use of a lubricating oil on the coated surface over a long time, the coated surface served as a boundary, causing an increase in temperature. Oxidation of the coated surface resulted, and sufficient wear resistance could not be obtained.

As described in Japanese Laid-open Patent Publication No. Sho. 57-85967, when a chromium-iron alloy layer with diffused chromium carbide particles is formed on a surface of the silent chain by subjecting the surface to a chromizing process, the hardness of the surface is improved by the particles of chromium carbide. However, since the chromium-iron alloy layer forming a base coated layer is a metal, the layer does not have sufficient wear-resistance. Additionally, in recent years, improved wear-resistance has been required in silent chains used in engines because of demand for high speed operation and long service life.

Accordingly, the objects of the invention are to solve the above-mentioned prior art problems and to provide a wear-resistant coating having excellent lubricating oil-retention properties, and to provide a coated silent chain having excellent wear-resistance.

SUMMARY OF THE INVENTION

A wear-resistant coating in accordance with the invention, having particular applicability to silent chains, comprises a base coating consisting of a hard inorganic material, in which particles consisting of a hard inorganic material different from the inorganic material of the base coating are interspersed, and in which a part of the interspersed particles is exposed at a surface of the coating. Preferably, the hard inorganic material of the base coating is vanadium carbide, and the interspersed particles are aluminum oxides.

When the coating is applied to the surface of a connector pin for a silent chain, wear between the connector pin and a link plate, caused by bending the silent chain, can be suppressed, and the amount of aging wear elongation of the chain can also be reduced. As a result, the service life of the chain can be improved.

In the invention, more than two sorts of inorganic materials can be used as the dispersed particles, provided that the inorganic materials of the dispersed particles are different from the hard inorganic material used as the base coating.

If the matrix or base material on which a coating is formed, is a metal such as a steel or the like, which is commonly used in silent chains, the coating can be applied without problems. However, the base material can also be applied to engineering plastics or ceramics.

The wear-resistant coating of the invention exhibits especially beneficial effects when it has been applied to a silent chain as described above. However, its use is not limited to silent chains, and the coating can also be applied to chains such as a roller chain, blade chains for wood processing, and the like.

Where according to the invention, a base coating consisting of a hard inorganic material, having interspersed particles of a hard inorganic material different from the inorganic material of the base coating, and where a part of the interspersed particles is exposed on the surface of the coating, the respective hard inorganic materials mutually complement each other.

Since both the base coating material and the particles interspersed into the base coating material are composed of hard inorganic materials, minute gaps are formed in the interface between the base coating material and interspersed inorganic particles. The minute gaps enhance the liquid-retaining properties of the coating. Consequently, a lubricating oil or the like can penetrate into these minute gaps, and contribute to the reduction of wear of the coated surface.

Where the hard inorganic material of the base coating is vanadium carbide, and the interspersed particles are aluminum oxide, the high hardness of vanadium carbide, and the anti-oxidation property of aluminum oxide, act synergistically to produce a dramatic improvement in wear-resistance.

When this wear-resistant coating is formed on at least a part of the surface of a silent chain, wear-resistance is maintained for a long period of time, even in a severe power transmission environment such as a high temperature and an oxidizing atmosphere (e.g., air), and the coating therefore contributes to a long service life of the chain.

In particular, when a silent chain is continuously wetted by a lubricating oil in use, excellent wear resistance, not found in other surface coating materials, is exhibited because of the liquid-retaining properties of the wear-resistant coating.

DETAILED DESCRIPTION OF THE PREFERRED EMBODIMENTS

Figure 1:
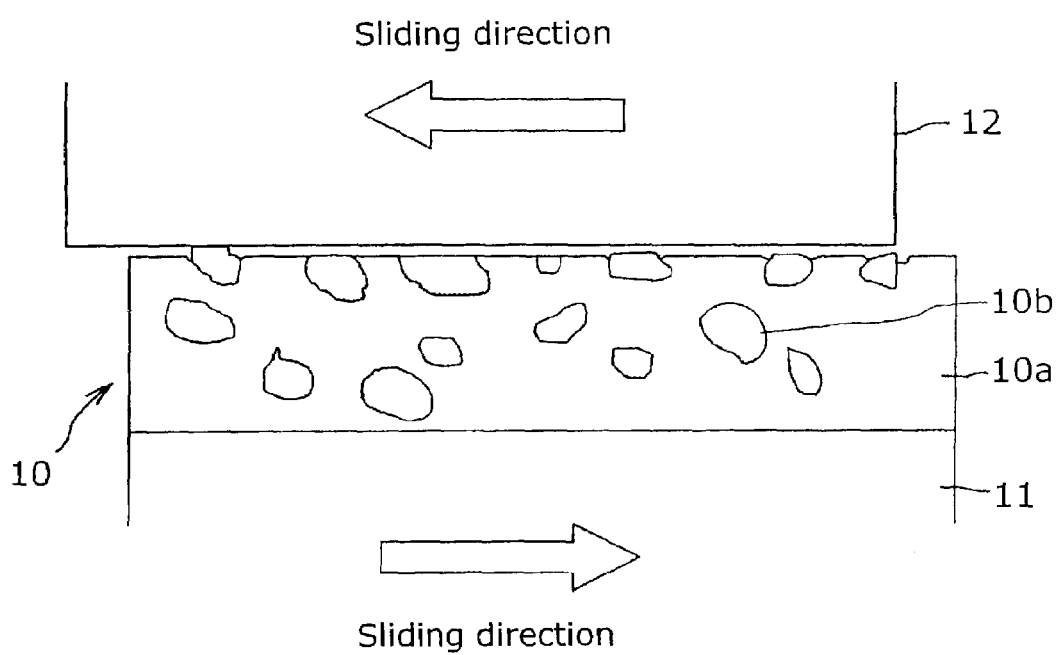
FIG. 1 is a cross-sectional schematic view of a wear-resistant coating according to the invention.

In FIG. 1 a wear-resistant coating 10 in accordance with the invention is formed on a matrix 11, such as a connector pin of a silent chain, which is opposite, and in sliding contact with, a material 12, which may be a link plate of the chain. A base coating 10a consists of a hard inorganic material, for example, vanadium carbide. Particles 10b, such as aluminum oxide particles, are interspersed in the base coating. The arrows seen at upper and lower portions of FIG. 1 depict the directions of sliding of the matrix 11 relative to the opposed material 12.

As is apparent from FIG. 1, where the wear-resistant coating 10 has interspersed particles 10b of aluminum oxide in a base coating 10a of vanadium carbide, a part of the interspersed particles 10b is exposed on the coated surface.

The coating 10 may be formed by adding aluminum oxide particles to powder in a diffusion coating process by the powder packing method. However, the methods of forming a wear-resistant coating 10 on the surface of the matrix 11 is not especially limited.

To investigate the wear properties of the wear-resistant coating, wear tests were carried out as described below. In an example according to the invention, a vanadium carbide coating, 15 $\mu$m in thickness, was formed on a matrix. In the coating, spherical aluminum oxide particles, each having a particle diameter of 1 $\mu$m or less, were uniformly interspersed. As a comparative example, a single-layered coating of vanadium carbide, having a thickness of 15 $\mu$m, was formed on a matrix of the same material.

The matrices on which the coatings were formed were set on a reciprocating friction test machine, and a measurement was made of the amount of wear produced by reciprocation for about 20 hours at a load weight of 637 N and a sliding speed of 0.6 m/s.

Figure 2:
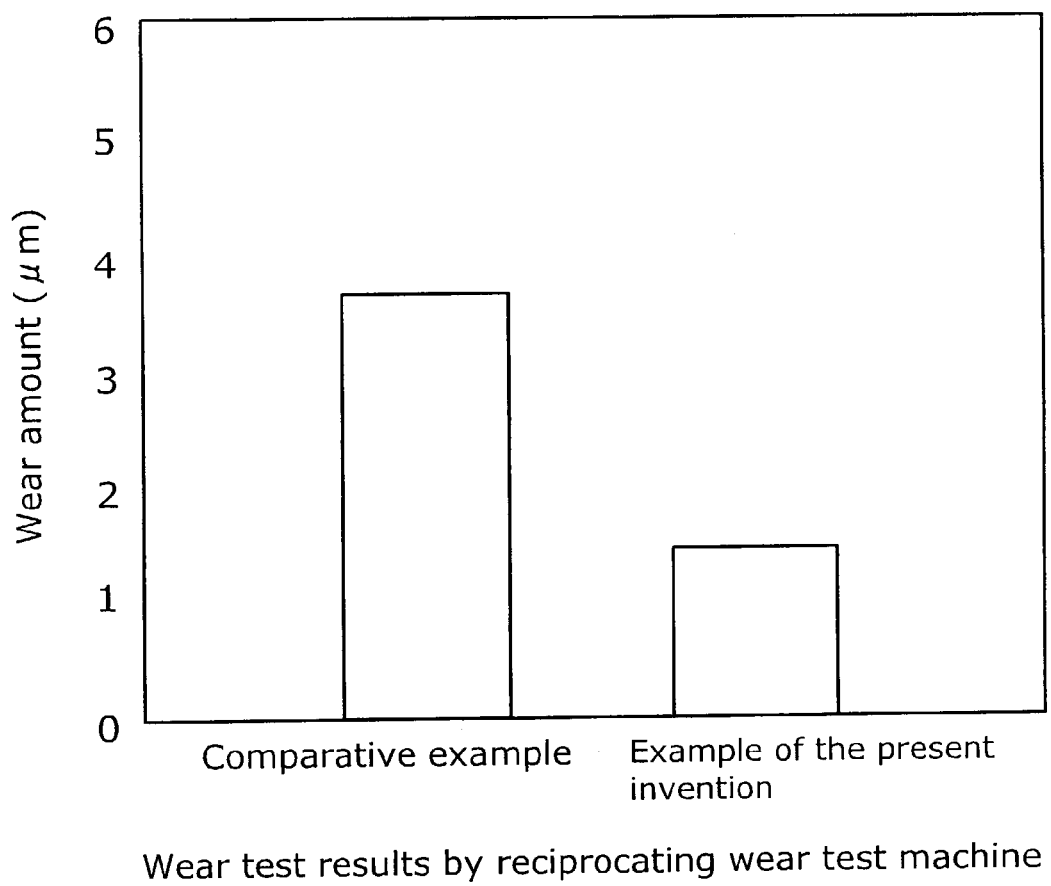
FIG. 2 is a bar graph showing a result of wear tests of the wear-resistant coating according to the invention.
Figure 3:
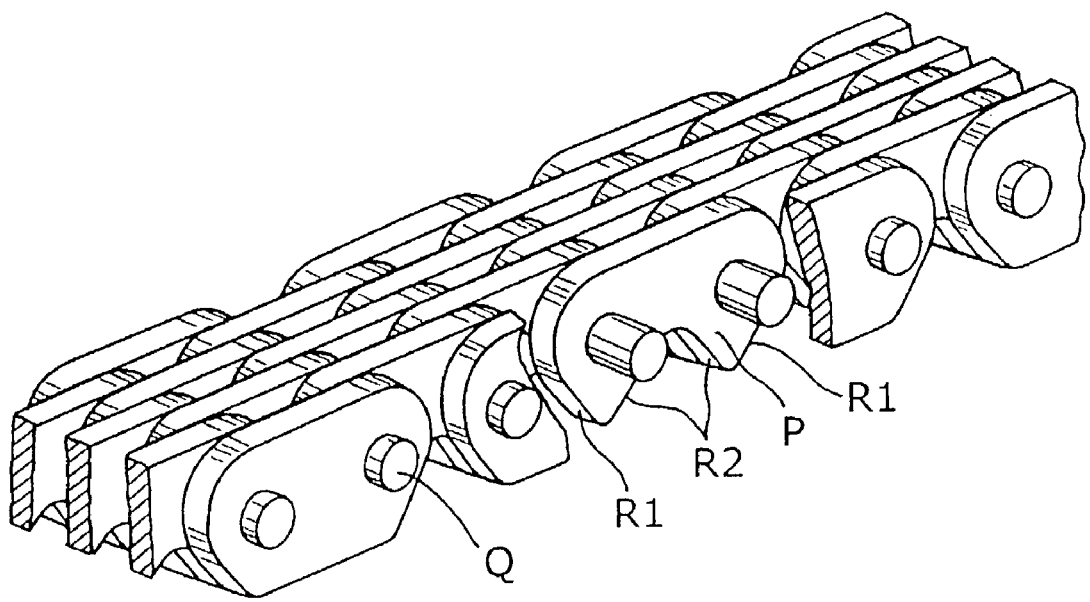
FIG. 3 is a perspective view showing the structure of a silent chain.

As is apparent from the test results shown in FIG. 2, the vanadium carbide coating with interspersed aluminum oxide particles exhibited a significantly smaller amount of wear compared to the wear exhibited by the single-layered, vanadium carbide coating.

The wear-resistant coating 10 thus formed on the surface of a silent chain forms minute gaps which have oil-retaining properties. Such gaps are not likely to be present in a wear-resistant coating in which hard inorganic material particles are interspersed in a base coating consisting of a conventional metallic material. Thus, the minute gaps improve the liquid retaining properties of the coating, and a lubricant such as lubricating oil can penetrate into the gaps so that excellent wear-resistance is achieved.

In the above-described example in accordance with the invention, spherical aluminum oxide particles were interspersed into a vanadium oxide base coating. However, even though those materials are preferred, the combination of hard inorganic materials used as the base coating material and the particles interspersed in the base coating is not limited to vanadium oxide and spherical aluminum oxide particles, respectively. For example, chromium carbide, titanium carbide, and the like, may be used as the base coating material instead of vanadium carbide. Also, the interspersed particles can be selected from inorganic materials such as silicon oxide, titanium oxide, chromium oxide and the like. More than two sorts of inorganic materials may be used, provided that the interspersed particles are a hard inorganic material or materials different from the hard inorganic material or materials used as the base coating material. The interspersed particles may take any of various shapes other than spherical, such as a plate shape, a polygonal particle shape, a fiber shape, or the like.

The wear-resistant coating and the silent chain coated with the wear-resistant coating as described above exhibit several beneficial effects, as follows.

When a base coating consisting of a hard inorganic material has interspersed in it particles consisting of a hard inorganic material different from the inorganic material of the base coating, and a part of the interspersed particles is exposed on the surface of the coating, the properties of the respective hard inorganic materials complement each other, and wear resistance is dramatically improved compared with the case in which a hard inorganic material is used by itself. Moreover, since a lubricant such as lubricating oil penetrates into minute gaps formed at the interface between the base coating material and the interspersed hard inorganic particles, the liquid-retaining property of the coating is improved, and wear of the coating can be suppressed significantly.

When the hard inorganic material forming the base coating is vanadium carbide, and the hard inorganic particles interspersed in the base coating are aluminum oxide, the high hardness of the vanadium carbide, and the anti-oxidation property of the aluminum oxide, act synergistically, so that wear resistance of the coating is further improved.

In a silent chain having the above-described, wear-resistant coating, wear-resistance can be maintained for a long period of time, and the service life of the silent chain is dramatically improved. In particular, in a silent chain which is wet by a lubricating oil when in use, excellent wear resistance, superior to that of other surface-coated materials, is achieved by the combination of wetting with the liquid-retaining properties of the coating.

We claim:

1. A wear-resistant coating comprising a base coating consisting of a hard inorganic material, in which particles consisting of a hard inorganic material different from said inorganic material of the base coating are interspersed, in which said interspersed particles are aluminum oxides and have a particle diameter of 1 $\mu$m or less, in which a part of said interspersed particles is exposed at a surface of said coating, and in which said hard inorganic material of said base coating is vanadium carbide.

* * * * *